April 17, 1962 J. L. LEESON, JR 3,030,554
CONTROL FOR A PLURALITY OF LOAD DEVICES
Filed May 23, 1958
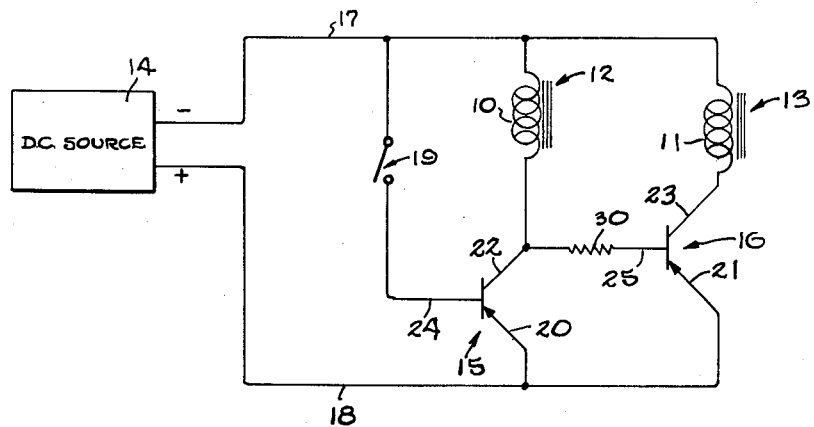
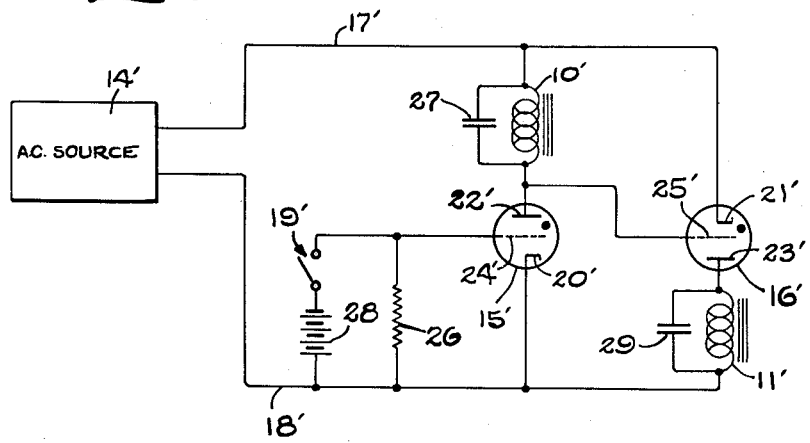
INVENTOR
James L. Leeson Jr.
by Carlsen, Pitzner, Hubbard & Wolfe
ATTORNEYS United States Patent Office 3,030,554
Patented Apr. 17, 1962

3,030,554
CONTROL FOR A PLURALITY OF
LOAD DEVICES
James L. Leeson, Jr., Beloit, Wis., assignor to Warner Electric Brake & Clutch Company, South Beloit, Ill., a corporation of Illinois
Filed May 23, 1958, Ser. No. 737,994
1 Claim. (Cl. 317—149)

This invention relates to electrical circuits for controlling the energization of a plurality of load devices and the primary object is to provide a novel and simplified circuit arrangement for alternately energizing one device and the another in response to completion and interruption of a circuit by a single switching means.

A more detailed object is to control current flow through the respective load devices by two electronic elements such as thyratrons or transistors which are interconnected in a novel manner for disabling one element and the associated load device and rendering the same effective respectively in response to conduction and cut-off of the other element.

Other objects and advantages of the invention will become apparent from the following detailed description taken in connection with the accompanying drawings, in which:

FIGURE 1 is a schematic wiring diagram of a control embodying the novel features of the present invention.

FIGURE 2 is a schematic wiring diagram of a modified control.

The present invention is especially suited for controlling the energization of the windings 10 and 11 of two electromagnets 12 and 13 which, for example, may be parts of a clutch and a brake adapted to apply driving and retarding torques respectively to a driven shaft (not shown). Current for energizing the windings is derived from a suitable source 14 and is controlled by separate electronic devices 15 and 16. In the preferred control of FIG. 1, the source supplies direct current which is transmitted over two conductors 17 and 18. The windings 10 and 11 are connected individually in the output circuits of the two devices, each output circuit extending between the two conductors and in series through the associated winding and common and output electrodes of the associated electronic device. Current flow in each output circuit varies with the potential applied to an input circuit extending between the common electrode and an input electrode of the associated device.

In accordance with the invention, the electronic devices 15 and 16 and a switching means 19 are interconnected in a novel manner to render one device or the other conductive selectively for energization of the associated winding 10 or 11 in response to actuation of the switching means. To this end, the switching means is connected to the input circuit of one electronic device 15 to apply and remove a control potential and thereby switch the device between conductive and non-conductive states. The input circuit of the other device 16 then is connected to the output circuit of the first device so that, in response to conduction and non-conduction by the first device, the second device respectively is cut-off and is rendered conductive for energization of its winding 11.

The electronic devices 15 and 16 in the preferred control of FIG. 1 are transistors and their emitters 20 and 21 constitute the common electrodes which are connected to one source conductor 18. The collectors 22 and 23 are the output electrodes and these are connected to the other source conductor 17 through the respective magnet windings 10 and 11. The polarity of the source 14 as applied to the conductors 17 and 18 is such that current flow between the base and the emitter of each transistor results in a corresponding current flow through the collector and the associated winding. In the case of the p-n-p junction type of transistor used in this instance, such current flow is obtained with the emitters 20 and 21 connected to the positive terminal of the source and the collectors 22 and 23 connected through the windings to the negative terminal of the source.

These polarities are indicated by the plus and minus signs in FIG. 1 and, as applied to the collectors, have been referred to as a so-called non-conductive bias. For n-p-n transistors, the polarities are reversed.

To render the first transistor 15 conductive and non-conductive selectively in response to actuation of a switching means 19, the latter is connected in series with the base or input electrode 24 of the transistor between the base and the conductor 17 for the negative terminal of the source 14, that is, the terminal connected to the collector 22 through the winding 10. While the switching means may take various forms such as another transistor, it is shown in the present instance as a single pole single throw manually operated switch.

When the switch 19 is open, the input circuit between the base 24 and the emitter 20 of the first transistor 15 is interrupted so that no current flows either in this circuit or in the output circuit between the emitter and the collector 22 and through the winding 10. Closure of the switch results in application of the voltage of the source 14 across the base and emitter with the latter connected to the positive terminal of the source. This is the correct polarity for current flow in the input circuit and therefore in the output circuit.

Conduction and non-conduction by the first transistor 15 are utilized to render the second transistor 16 non-conductive and conductive respectively by connecting the base 25 and emitter 21 of the second transistor to spaced points of the output circuit of the first transistor. Herein, the second base 25 is connected to the second collector 22 and the second emitter in connected directly to the first emitter 21. With this arrangement, the base and emitter of the second transistor are substantially at the same potential so that the second transistor is cut-off when the collector to emitter resistance of the first transistor is reduced by conduction of the first transistor.

When the switch 19 is open for cut-off of the first transistor 15, the collector to emitter resistance thereof is increased so that the potential between the base and emitter of the second transistor approaches that of the source 14. Current then flows in the input circuit of the second transistor to render the same conductive for energization of the second winding 11. Preferably, a resistor 30 is connected in series with the base of the second transistor to limit current flow through the first winding 10 to a low value when the second transistor conducts.

To avoid energization of the two windings 10 and 11 simultaneously, the various circuit parameters including the voltage of the source 14 are selected in accordance with the characteristics of the first transistor 15 so that, when the switch 19 is closed, the first transistor is in a "fully on" or saturated conductive state. Not only does this insure that the potential between the input electrodes of the second transistor is substantially zero for complete cut-off of this transistor, but also, it avoids excessive power dissipation and damage in the first transistor.

It will be apparent that the novel circuit arrangement described above makes possible alternate and selective energization of the windings 10 and 11 simply by closing and opening the switch 19 and thereby applying a voltage to and removing the same from the input circuit of the first transistor 15. A similar single pole double throw type of switching action in response to the application and removal of a control voltage may be obtained where the electronic devices are thyratrons as shown in FIG. 2. In this modified control, parts corresponding to those of the preferred control of FIG. 1 bear similar but primed reference characters.

The source 14' of the modified control supplies alternating current to the thyratrons 15' and 16' and the windings 10' and 11' through conductors 17' and 18'. One winding 10' connects the plate or output electrode 22' of the first tube to one conductor 17' and the cathode or common electrode of this tube is connected directly to the other conductor 18'. The tube then conducts to provide a rectified current in the winding when the control grid or input electrode 24' is at the same potential or at a positive potential with respect to the cathode. In the present instance, the grid is connected by a resistor 26 directly to the cathode so that the two are at the same potential for conduction by the tube when no other voltage is applied between these electrodes. Preferably, a capacitor 27 is connected across the winding to smooth the current pulsations during conduction by the tube.

To change the conductive condition of the first tube 15' in response to actuation of the switch 19', the latter is connected in series with a source 28 of direct current across the grid resistor 26. The positive side of this source is connected to the cathode 20'. Thus, when the switch is closed, the grid 24' is at a negative potential with respect to the cathode so as to render the tube non-conductive. When the switch is open, the grid and cathode remain connected by the resistor and are at substantially the same potential to permit conduction by the tube. By making the resistor of a relatively high value, for example, 100,000 ohms, correspondingly high values of resistance may exist between the switch contacts and the source still will be effective to cut off the tube.

Conduction in the second tube 16' is varied as an incident to conduction in the first tube 15' by connecting the grid 25' of the second tube to the plate 22' of the first tube and the cathode 21' of the second tube to the source conductor 17' which is connected to the first load winding 10'. The plate 23' of the second tube then is connected to the other conductor 18' by the second winding 11' and a parallel smoothing capacitor 29. With this arrangement, the potential across the first winding resulting from current flow through the first tube is applied between the grid and cathode of the second tube. This potential renders the second grid negative with respect to the cathode so that the second tube is non-conductive when the first tube conducts. When the switch 19' is closed and the first tube is non-conductive, the potential across the first winding is substantially zero so that the second tube conducts.

In both of the controls described above, one load winding is energized when the switch 19 is open and the other winding is energized when the switch is closed. This desired operation is achieved simply and with few parts by connecting the switch in the input circuit of only one electronic device and varying conduction in the other device in response to changes in the conductive condition of the first device. Such variation in conduction by the second device also is accomplished in a simple manner by direct connections between the output circuit of the first device and the input circuit of the second device for biasing the latter in accordance with changes in the current flow in the output circuit of the first device.

I claim as my invention:

A double-throw switch means for alternatively energizing an electric clutch winding and an electric brake winding from a common alternating current source, which means comprises, first and second conductors adapted for connection to the terminals of said source of alternating current, a first gaseous discharge tube having an anode, a cathode and a control grid with its cathode connected directly to said first conductor, one of said windings connecting said anode of said tube to said second conductor, a first smoothing capacitor shunting said one of said windings, a second similar gaseous discharge tube having its cathode connected directly to said second conductor, the other of said windings connecting the anode of said second tube to said first conductor, a second smoothing capacitor shunting said other of said windings, a grid bias circuit for said first tube connected between said grid and said cathode thereof and including means for applying a negative bias to and removing the same from the grid to render the tube respectively non-conductive and conductive, and a connection between the grid of said second tube and said anode of said first tube to apply the voltage drop across said one of said windings and said first capacitor between the grid and cathode of the second tube to render the latter conductive when the first tube is non-conductive and to bias the grid of the second tube negatively to render the second tube non-conducitve in response to conduction by the first tube.

References Cited in the file of this patent

UNITED STATES PATENTS

| | | |
|---|---|---|
| 1,995,810 | Klemperer | Mar. 26, 1935 |
| 2,053,156 | Livingston | Sept. 1, 1936 |
| 2,611,863 | Bivens | Sept. 23, 1952 |
| 2,671,169 | Norton | Mar. 2, 1954 |
| 2,770,764 | McAide et al. | Nov. 13, 1956 |
| 2,900,502 | Kuehn et al. | Aug. 18, 1959 |
| 2,946,418 | Leeson | July 26, 1960 |